(12) United States Patent
Tan et al.

(10) Patent No.: US 10,345,867 B2
(45) Date of Patent: Jul. 9, 2019

(54) SHAFT STRUCTURE AND ELECTRONIC APPARATUS

(71) Applicant: Lenovo (Beijing) Co., Ltd., Beijing (CN)

(72) Inventors: Tianshui Tan, Beijing (CN); Liang Han, Beijing (CN); Ran Zhang, Beijing (CN)

(73) Assignee: LENOVO (BEIJING) CO., LTD., Beijing (CN)

(*) Notice: Subject to any disclaimer, the term of this patent is extended or adjusted under 35 U.S.C. 154(b) by 0 days.

(21) Appl. No.: 15/617,254

(22) Filed: Jun. 8, 2017

(65) Prior Publication Data

US 2017/0357295 A1 Dec. 14, 2017

(30) Foreign Application Priority Data

Jun. 8, 2016 (CN) .......................... 2016 1 0405764
Jun. 8, 2016 (CN) .......................... 2016 1 0405884

(51) Int. Cl.
*G06F 1/16* (2006.01)
*H04M 1/02* (2006.01)

(52) U.S. Cl.
CPC .......... *G06F 1/1681* (2013.01); *G06F 1/1652* (2013.01); *H04M 1/022* (2013.01); *H04M 1/0268* (2013.01)

(58) Field of Classification Search
CPC .............................. G06F 1/1652; G06F 1/1681
See application file for complete search history.

(56) References Cited

U.S. PATENT DOCUMENTS

| 9,021,657 B2* | 5/2015 | Park | H05K 5/0226 16/354 |
|---|---|---|---|
| 9,115,750 B2* | 8/2015 | Park | F16C 11/10 |
| 2004/0052044 A1 | 3/2004 | Mochizuki et al. | |
| 2014/0247551 A1* | 9/2014 | Xia | G06F 1/1632 361/679.43 |
| 2016/0060931 A1* | 3/2016 | Zhang | E05D 3/12 361/679.55 |

FOREIGN PATENT DOCUMENTS

| CN | 202560799 U | 11/2012 |
|---|---|---|
| CN | 103543789 A | 1/2014 |
| CN | 105516409 A | 4/2016 |
| CN | 105528035 A | 4/2016 |
| CN | 105590554 A | 5/2016 |
| CN | 205751382 U | 11/2016 |
| CN | 205978040 U | 2/2017 |
| JP | H03137379 A | 6/1991 |
| WO | 2010128782 A1 | 11/2010 |

* cited by examiner

*Primary Examiner* — Adrian S Wilson
(74) *Attorney, Agent, or Firm* — Anova Law Group, PLLC

(57) ABSTRACT

A shaft structure includes a rotation shaft, a transmission structure coupled to the rotation shaft, and a moving structure coupled to the transmission structure. The rotation shaft includes a first transmission member fixedly arranged on the rotation shaft. The transmission structure rotates along with the rotation shaft, and includes a second transmission member engaged with the first transmission member. The moving structure moves translationally with respect to the rotation shaft in response to a rotation of the transmission structure.

18 Claims, 11 Drawing Sheets

400

SHAFT STRUCTURE AND ELECTRONIC APPARATUS

CROSS-REFERENCE TO RELATED APPLICATIONS

This application claims priority to Chinese Patent Application Nos. 201610405764.8, and 201610405884.8, both filed on Jun. 8, 2016, the entire contents of both of which are incorporated herein by reference.

TECHNICAL FIELD

The present disclosure relates to the technology of electronic products and, more particularly, to a shaft structure, an electronic apparatus having the shaft structure, and a method for mounting a flexible display.

BACKGROUND TECHNOLOGIES

Many electronic apparatuses, such as some laptops and mobile phones, use a rotation shaft to connect two parts so they can be opened and closed. Usually, the relative distance of each of the parts to the rotation shaft does not change when the two parts are rotating. Thus, if the electronic apparatus has a flexible display covering the rotation shaft and the two parts, the flexible display may dislocate when the electronic apparatus is opened, which may affect the operation of the flexible display.

Further, the two parts of the electronic apparatus are usually rigid components. The flexible display may not attach to the rigid components firmly. When the two parts are rotated, the rigid components may exert a compressive force or a tensile force on the flexible display, which may easily damage the flexible display, affecting the quality of the product.

SUMMARY

In accordance with the disclosure, there is provided a shaft structure including a rotation shaft, a transmission structure coupled to the rotation shaft, and a moving structure coupled to the transmission structure. The rotation shaft includes a first transmission member fixedly arranged on the rotation shaft. The transmission structure rotates along with the rotation shaft, and includes a second transmission member engaged with the first transmission member. The moving structure moves translationally with respect to the rotation shaft in response to a rotation of the transmission structure.

Also in accordance with the disclosure, there is provided an electronic apparatus including a first body, a second body, and a shaft structure coupling the first body to the second body. The shaft structure includes a rotation shaft, a transmission structure coupled to the rotation shaft, and a moving structure coupled to the transmission structure. The rotation shaft includes a first transmission member fixedly arranged on the rotation shaft. The transmission structure rotates along with the rotation shaft. and includes a second transmission member engaged with the first transmission member. The moving structure moves translationally with respect to the rotation shaft in response to a rotation of the transmission structure.

DESCRIPTION OF EMBODIMENTS

Hereinafter, embodiments of the disclosure will be described with reference to the drawings, which are merely examples for illustrative purposes and are not intended to limit the scope of the disclosure. Wherever possible, the same reference numbers will be used throughout the drawings to refer to the same or like parts.

The embodiments described below are merely part rather than all of the embodiments of the disclosure. All other embodiments that can be derived by one of ordinary skill in the art based on the disclosed embodiments without inventive effort are within the scope of the disclosure.

Embodiments of the disclosure include a shaft structure, an electronic apparatus including the shaft structure, and a method for mounting a flexible display. With the disclosed shaft structure, no dislocation will happen when the flexible display flattens out. As such, the operation performance of the electronic apparatus can be improved.

Figure 1:
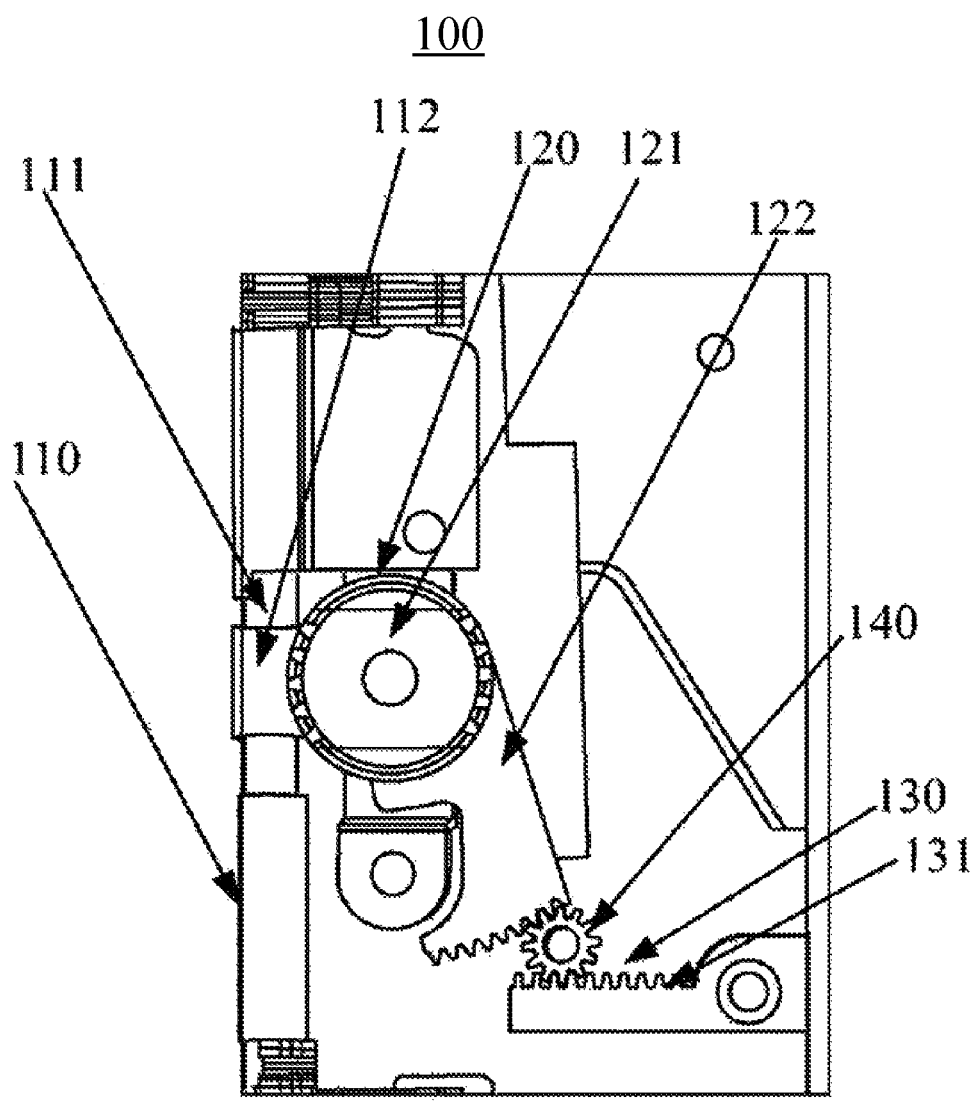
FIG. 1 shows an example of shaft structure consistent with some embodiments.

FIG. 1 shows an example of shaft structure 100 consistent with some embodiments. The shaft structure 100 can be used to rotatably connect two parts of an electronic apparatus, as will be described in more detail below with reference to FIG. 2.

As shown in FIG. 1, the shaft structure 100 includes a shaft set 110, a transmission structure 120, and a moving structure 130. The shaft set 110 includes at least a first rotation shaft 111 and a first transmission member 112 fixedly arranged on the first rotation shaft 111.

The transmission structure 120 is coupled to the first rotation shaft 111. When the first rotation shaft 111 rotates, the transmission structure 120 can rotate with the first rotation shaft 111. The transmission structure 120 includes at least a second transmission member 121 engaged with the first transmission member 112 such that the driving force on the first rotation shaft 111 can be transmitted to the transmission structure 120 through the first transmission member 112. Further, when the first transmission member 112 rotates in a first direction, the second transmission member 121 can rotate in a second direction. A rotation plane corresponding to the second direction is approximately perpendicular to a rotation plane corresponding to the first direction. In this disclosure, the rotation plane corresponding to the first direction may refer to a plane approximately perpendicular to an axle center of the first transmission member 112 (or an axis of the first rotation shaft 111), and the rotation plane corresponding to the second direction may refer to a plane approximately perpendicular to an axle center of the second transmission member 121. In some embodiments, the rotation plane corresponding to the second direction is approximately parallel to the axle center of the first transmission member 112 (or the axis of the first rotation shaft 111). In some embodiments, the engagement between the first transmission member 112 and the second transmission member 121 can be, e.g., an engagement between two bevel gears or an engagement between a worm screw and a worm wheel.

The moving structure 130 is coupled to the transmission structure 120. When the transmission structure rotates along with the first rotation shaft 111, the moving structure 130 can also rotate along with the first rotation shaft 111. Further, the transmission structure 120 can drive the moving structure 130 to move translationally with respect to the first rotation shaft 111 while rotating, such that the moving structure 130 can move toward or away from the first rotation shaft 111.

A rotation plane of the first rotation shaft 111 can be regarded as a first plane. In some embodiments, the first transmission member 112 on the first rotation shaft 111 can include a first gear arranged at a peripheral of the first rotation shaft 111 and around the first rotation shaft 111. That is, the first rotation shaft 111 and the first transmission member 112 can form a gear shaft. A rotation center of the first transmission member 112 overlaps a rotation center of the first rotation shaft 111. The rotation center is the axel center of the first rotation shaft 111.

In some embodiments, the second transmission member 121 of the transmission structure 120 can include a second gear engaged with the first gear, such that the first gear can drive the second gear to rotate. A rotation plane of the second gear can be regarded as a second plane. The second plane can be approximately perpendicular to the first plane. For example, if the first plane is a horizontal plane parallel to the ground, the second plane can be a vertical plane perpendicular to the horizontal plane.

The embodiments also include a transmission coupling between the moving structure 130 and the transmission structure 120. Thus, when the transmission structure 120 moves, such as rotates, the transmission structure 120 can drive the moving structure 130 to move. For example, the transmission structure 120 can provide a driving force through the second transmission member 121 to cause the moving structure 130 to move translationally.

In the shaft structure 100 consistent with some embodiments, the first rotation shaft 111 can rotate and drive the moving structure 130 to move. In some embodiments, when the shaft set 110 rotates, a distance between the moving structure 130 and the first rotation shaft 111 can be changed. Thus, the shaft structure 100 can fit the need of an electronic apparatus to change a distance between a component coupled to the shaft structure 100 and the first rotation shaft 111 when the shaft set 110 rotates.

The shaft structure 100 can further include a component (not shown) fixedly coupled to the moving structure 130 to ensure a synchronized rotation of the moving structure 130 and the first rotation shaft 111. The component can include, for example, a socket joint member. A part of the socket joint member can be fixedly coupled to the moving structure 130 and another part of the socket joint member can be fixedly coupled to the first rotation shaft 111.

In some embodiments, as shown in FIG. 1, the transmission structure 120 further includes a third transmission member 122. A first end of the third transmission member 122 is fixedly coupled to the second transmission member 121 and a second end of the third transmission member 122 is coupled to the moving structure 130. When the second transmission member 121 rotates in the second direction, the first end of the third transmission member 122 can rotate in the second direction, and the second end of the third transmission member 122 can rotate in the second direction with respect to the first end. That is, the second transmission member 121 can drive the entire third transmission member 122 to rotate synchronously with the second transmission member 121. As such, the second end of the third transmission member 122 can drive the moving structure 130 to move along a line connecting the moving structure 130 and the first rotation shaft 111. That is, the second end of the third transmission member 122 can drive the moving structure 130 to move away from or toward the first rotation shaft 111. In some embodiments, the electronic apparatus can include a part coupled to the moving structure 130. Thus, when the first rotation shaft 111 rotates, the part of the electronic apparatus coupled to the moving structure 130 can also be driven to move translationally with respect to the first rotation shaft 111.

In some embodiments the third transmission member 122 and the second transmission member 121 can be fixedly coupled to each other. In some embodiments, the third transmission member 122 and the second transmission member 121 share a common rotation shaft. The second transmission member 121 and the third transmission member 122 both rotate around the common rotation shaft. As such, the stability of the transmission and the compactness of the structure can be improved. Here, the arc trajectory of the edge of the second transmission member 121 during the rotation of the second transmission 121 is also referred to as a first arc, and the arc trajectory of the edge of the second end of the third transmission member 122 during the rotation of the third transmission member 122 is also referred to as a second arc. A circle including the first arc has a radius smaller than that of a circle including the second arc. That is, to the third transmission member 122, the common rotation shaft is an eccentric shaft, i.e., the rotation shaft is not located at the geometrical center of the third transmission member 122. In some embodiments, the distance between the first end and the second end of the third transmission member 122 can be larger than a diameter of the second gear (the second transmission member 121). Usually, the distance from the rotation shaft of the third transmission member 122 to the first end is smaller than the distance to the second end. Therefore, the rotation can be amplified. In some embodiments, as shown in FIG. 1, the arc formed by the first end of the third transmission member 122 rotating around the rotation shaft is on the same circle as the arc formed by the second transmission member 121 rotating around the rotation shaft.

In some embodiments, the second transmission member 121 and the third transmission member 122 can be two independent and separate components. In some other embodiments, the second transmission member 121 and the third transmission member 122 can be two parts of a one-piece transmission assembly.

In some embodiments, the first rotation shaft 111 is coupled to a connection board, and the transmission structure 120 and the moving structure 130 are both arranged on the connection board, such that the first rotation shaft 111, the transmission structure 120, and the moving structure 130 can rotate together.

In some embodiments, the third transmission member 122 can be directly engaged with the moving structure 130. In these embodiments, the third transmission member 122 can directly drive the moving structure 130 to move translationally.

In some embodiments, as shown in FIG. 1, the shaft structure 100 further includes at least one fourth transmission member 140. The moving structure 130 includes a transmission bar 131, such as a gear rack, fixedly arranged on the moving structure 130. The transmission bar 131 can move along the line connecting the moving structure 130 and the first rotation shaft 111. A first side of the fourth transmission member 140 is engaged with the second end of the second transmission member 122 to transmit the driving force. A second side of the fourth transmission member 140 is engaged with the transmission bar 131. As such, the driving force can be transmitted from the second end of the third transmission member 122 to the transmission bar 131 through the fourth transmission member 140.

In some embodiments, the fourth transmission member 140 can include one or more third gears. When one third gear is provided, the third transmission member 122 and the transmission bar 131 are arranged on two sides of the third gear. When multiple third gears are provided, two of the multiple third gears at the two ends are engaged with the third transmission member 122 and the transmission bar 131, respectively, to transmit the driving force of the third transmission member 122 to the transmission bar 131 through the multiple third gears.

The contact position between the second end of the third transmission member 122 and the fourth transmission member 140 can be fixed or unfixed. For example, in FIG. 1, the contact position between the second end of the third transmission member 122 and the fourth transmission member 140 is not fixed.

When the first transmission member 112 rotates in the first direction from a first angle to a second angle, the second transmission member 121 can rotate in the second direction from a third angle to a fourth angle and the second end of the third transmission member 122 can rotate in the second direction from a first position to a second position. The second end of the third transmission member 122 can then drive the first side of the fourth transmission member 140, causing the second side of the fourth transmission member 140 to move on the transmission bar 131, so as to drive the moving structure 130 to move from a third position to a fourth position.

The number of the fourth transmission member 140 can be an odd number or an even number. In some embodiments, there are odd number of fourth transmission members 140. When the first transmission member 112 rotates counter-clockwise in its rotation plane, the moving structure 130 moves toward the first rotation shaft 111. Further, when the first transmission member 112 rotates clockwise in its rotation plane, the moving structure 130 moves away from the first rotation shaft 111.

More specifically, when the first transmission member 112 rotates clockwise in its rotation plane, the second transmission member 121 can rotate counter-clockwise in its rotation plane. In this scenario, if there are odd number of fourth transmission member(s) 140, the interaction between the third transmission member 122 and the fourth transmission member(s) 140 may cause the fourth transmission member(s) 140 to move toward the first rotation shaft 111. As such, under the reverse action of the fourth transmission member(s) 140, the moving structure 130 may cause the transmission bar 131 to move away from the first rotation shaft 111. On the other hand, when the first transmission member 112 rotates counter-clockwise in its rotation plane, the second transmission member 121 can rotate clockwise in its rotation plane. In this scenario, if there are odd number of fourth transmission member(s) 140, the interaction between the third transmission member 122 and the fourth transmission member(s) 140 may cause the fourth transmission member(s) 140 to move away from the first rotation shaft 111. As such, under the reverse action of the fourth transmission member(s) 140, the moving structure 130 may cause the transmission bar 131 to move toward the first rotation shaft 111.

In some other embodiments, the second transmission member 121, the third transmission member 122, the fourth transmission member 140, and the transmission bar 131 are structured and arranged in a manner that when the second transmission member 121 rotates counter-clockwise in its rotation plane, if there are odd number of fourth transmission member(s) 140, the interaction between the third transmission member 122 and the fourth transmission member(s) 140 may cause the fourth transmission member(s) 140 to move away from the first rotation shaft 111 and the transmission bar 131 may move toward the first rotation shaft 111. Further, when the second transmission member 121 rotates clockwise in its rotation plane, if there are odd number of fourth transmission member(s) 140, the interaction between the third transmission member 122 and the fourth transmission member(s) 140 may cause the fourth transmission member(s) 140 to move toward the first rotation shaft 111 and the transmission bar 131 may move away from the first rotation shaft 111.

In some embodiments, the rotation shaft(s) of the fourth transmission member(s) 140 are fixed. In these embodiments, the fourth transmission member(s) 140 do not move away from or toward the first rotation shaft 111 but can rotate when the third transmission member 122 rotates. In these embodiments, the movement of the transmission bar 131 as a result of the rotation of the first transmission member 112 can be similar to that described above.

With the shaft structure provided by the embodiments, through the relative movement between the first transmission member 112, the second transmission member 121, the third transmission member 122, the fourth transmission member 140, and the transmission bar 131, the transmission bar 131 can be driven to move toward or away from the first rotation shaft 111 when the first rotation shaft 111 rotates.

Figure 2:
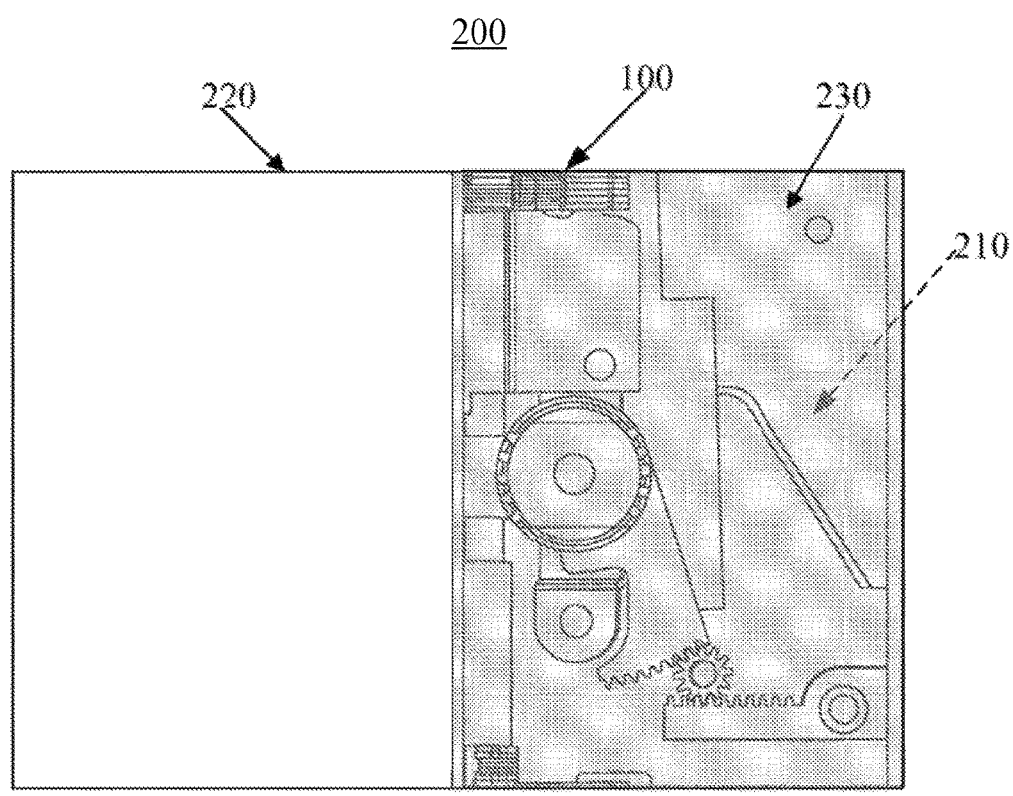
FIG. 2 shows an example of electronic apparatus consistent with some embodiments.

FIG. 2 shows an example of electronic apparatus 200 consistent with some embodiments. As shown in FIG. 2, the electronic apparatus 200 includes the shaft structure 100, a first part 210, also referred to as a first body 210, and a second part 220, also referred to as a second body 220. The first body 210 is fixedly coupled to the moving structure 130 of the shaft structure 100, and the second body 220 can be coupled to two ends of the shaft structure 100, such as the top end and the bottom end of the shaft structure 100. Thus, when the shaft structure 100 rotates, the distance between the first body 210 and the first rotation shaft 111 can be changed. In some other embodiments, the shaft structure 100 can be fixedly coupled to the second body 220 through the moving structure 130, while the first body 210 can be coupled to the two ends of the shaft structure 100. In these embodiments, when the shaft structure 100 rotates, the distance between the second body 220 and the first rotation shaft can be changed.

In the embodiments described above, the shaft set 110 includes the first rotation shaft 111. In some other embodiments, the shaft set 110 can include more than one rotation shaft, such that the part(s) of the electronic apparatus connected to a shaft structure including the shaft set can open and turn with a larger degree.

Figure 3:
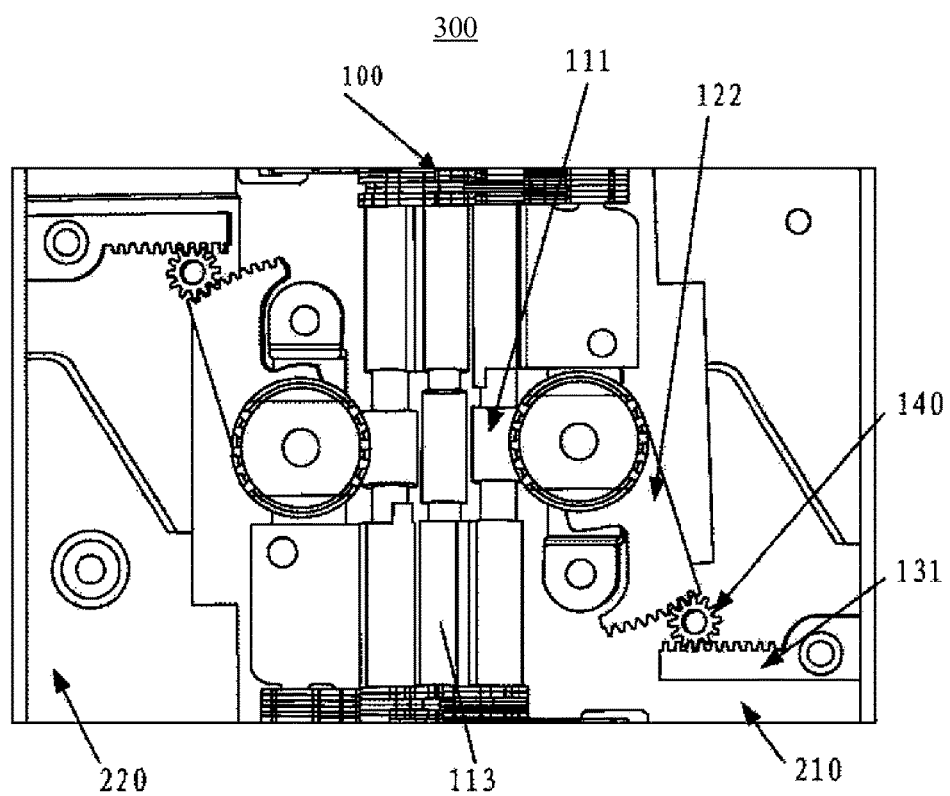
FIG. 3 shows another example of electronic apparatus consistent with some embodiments.

FIG. 3 shows another example of electronic apparatus 300 consistent with some embodiments. As shown in FIG. 3, the electronic apparatus 200 includes the first body 210 and the second body 220 coupled to each other by the shaft structure 100. By rotating the shaft structures 100, the angle between the first body 210 and the second body 220 can be changed. Further, at least the distance between the first body 210 and the first rotation shaft 111 of the shaft structure 100 fixedly coupled to the first body 210 can be changed.

In the example shown in FIG. 3, the shaft structure 100 includes two shaft assemblies, also referred to as "shaft modules," coupled to the first body 210 and the second body 220, respectively. Each of the shaft assemblies includes the components of the example of shaft structure 100 shown in FIG. 1. The two shaft assemblies are coupled to each other through a second rotation shaft 113, and are arranged centrosymmetric to each other with respect to a center point on the second shaft 113. That is, in the embodiments shown in FIG. 3, the shaft set 110 of the shaft structure 100 includes the first rotation shaft 111 of each of the shaft assemblies and the second rotation shaft 113.

In some embodiments, a fifth transmission member is arranged on the second rotation shaft 113 and is engaged with the first transmission member 112 of at least one of the shaft assemblies. When the first transmission member 112 rotates in the first direction, the fifth transmission member can rotate in a direction opposite to the first direction. Similar to the first transmission member 112, the fifth transmission member can be a gear arranged at a peripheral of the second rotation shaft 113 and around the second rotation shaft 113. In some embodiments, the fifth transmission member includes a fourth gear. The fourth gear can be engaged with the third gear of at least one of the shaft assemblies. In some embodiments, the rotation directions of the first transmission member 112 and the fifth transmission member are always opposite to each other.

In the electronic apparatus 300 shown in FIG. 3, the two shaft assemblies of the shaft structure 100 can be referred to as a "first shaft assembly" and a "second shaft assembly," respectively. The connection from the first end to the second end of the third transmission member 122 in the first shaft assembly is opposite to that in the second shaft assembly. The first body 210 is fixedly coupled to the moving structure 130 of the first shaft assembly and the second body 220 is fixedly coupled to the moving structure 130 of the second shaft assembly. Thus, when the first and second shaft assembly rotate, the distance between the first body 210 and the first rotation shaft 111 of the first shaft assembly and the distance between the second body 220 and the first rotation shaft 111 of the second shaft assembly can both be changed.

By rotating the shaft structure 100 shown in FIG. 2, or one or both of the shaft assemblies of the shaft structure 100 shown in FIG. 3, the first body 210 and the second body 220 can rotate with respect to each other. The angle between the first body 210 and the second body 220 can be changed from about 0° to about 180°. In some embodiments, the angle can be changed from about 0° to about 360°. When the angle between the first body 210 and the second body 220 is about 0° or about 360°, the first body 210 and the second body 220 touch or are close to each other, and the electronic apparatus is in a closed state. The first body 210 and the second body 220 being close to each other refers to the scenario that the distance between the first body 210 and the second body 220 is very small and, in some embodiments, smaller than a preset distance. Consistent with the embodiments, when the angle between the two bodies is changed, the distance between the two bodies can also be changed.

In some embodiments, the first and second bodies 210 and 220 can function as supporting members of the electronic apparatus 200, 300. Electronic components, such as a central processing unit (CPU), can be arranged on the supporting members.

Referring again to FIG. 2, the electronic apparatus 200 further includes a flexible display 230. The flexible display 230 covers at least the first body 210 and the shaft structure 100. One end of the flexible display 230 is fixedly coupled to the first body 210. In some embodiments, the portion of the flexible display 230 that covers the shaft structure 100 can bend when the shaft structure 100 rotates. The flexible display 230 can include, for example, a projector display, a flexible liquid crystal display, or a flexible electronic ink display.

In some embodiments, the flexible display 230 completely covers the first body 210 and the shaft structure 100. When the shaft structure 100 rotates to change the angle between the first body 210 and the second body 220, the flexible display 230 can bend to different degrees.

In some embodiments, the flexible display 230 can be arranged on a first surface of the first body 210. When the angle between the first body 210 and the second body 220 is about 0°, i.e., when the electronic apparatus is in the closed state, the second body 220 faces a second surface of the first body 210 and touches or is close to the second surface of the first body 210. The first surface of the first body 210 is opposite to the second surface of the first body 210. Thus, the first surface of the first body 210 is also referred to as an outer surface of the first body 210.

As described above, instead of the arrangement shown in FIG. 2, in some other embodiments, the shaft structure 100 can be fixedly coupled to the second body 220 through the moving structure 130, while the first body 210 can be coupled to the two ends of the shaft structure 100. In these embodiments, the flexible display 230 can be arranged to cover the second body 220 and the shaft structure 100. In some embodiments, the flexible display 230 can completely cover the second body 220 and the shaft structure 100.

In some embodiments, the flexible display 230 can be arranged on a first surface of the second body 220. When the angle between the first body 210 and the second body 220 is about 0°, i.e., when the electronic apparatus is in the closed state, the first body 210 faces a second surface of the second body 220 and touches or is close to the second surface of the second body 220. The first surface of the second body 220 is opposite to the second surface of the second body 220. Thus, the first surface of the second body 220 is also referred to as an outer surface of the second body 220. The first surface of the first body 210 and the first surface of the second body 220 can be collectively referred to as an outer surface of the electronic apparatus.

Figure 4:
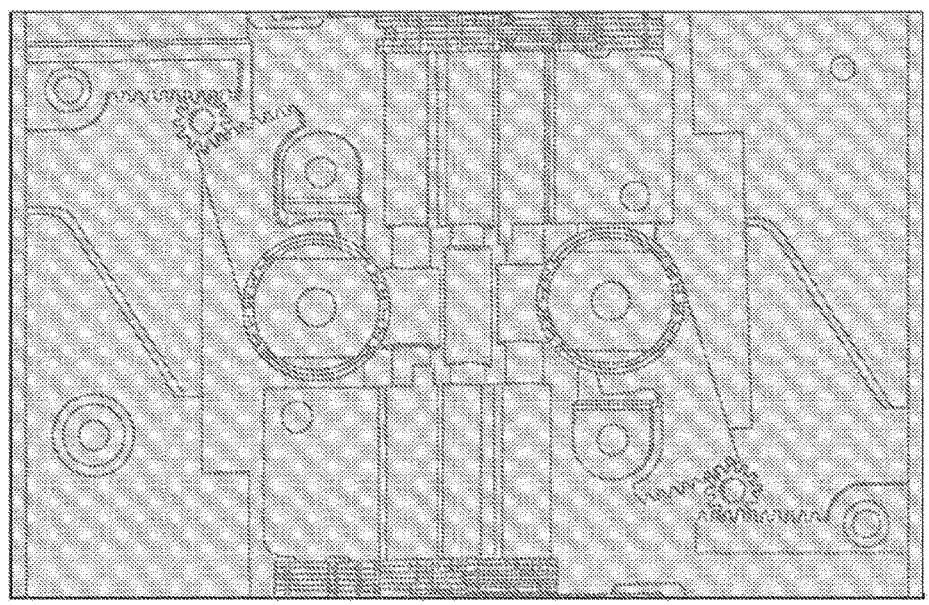
FIG. 4 shows another example of electronic apparatus consistent with some embodiments.

In some embodiments, as described above in connection with FIG. 3, the shaft structure 100 of the electronic apparatus includes two shaft assemblies. FIG. 4 shows another example of electronic apparatus 400 consistent with some embodiments. Similar to the electronic apparatus 300 in FIG. 3, the shaft structure of the electronic apparatus 400 also includes two shaft assemblies. Further, in the electronic apparatus 400, the flexible display covers both the first body, the second body, and the shaft assemblies of the shaft structure. In some embodiments, the flexible display completely covers the first body, the second body, and the shaft structure. In some embodiments, the flexible display is arranged on the first surface of each of the two bodies, i.e., on the outer surface of the electronic apparatus 400.

As described above, when the angle between the first body 210 and the second body 220 increases, at least the distance between the first body 210 and the first rotation shaft 111 of the shaft assembly coupled to the first body 210 can increase. In some embodiments, the distance between the second body 220 and the first rotation shaft 111 of the shaft assembly coupled to the second body 210 can also increase.

Similarly, when the angle between the first body 210 and the second body 220 decreases, at least the distance between the first body 210 and the first rotation shaft 111 of the shaft assembly coupled to the first body 210 can decrease. In some embodiments, the distance between the second body and the first rotation shaft 111 of the shaft assembly coupled to the second body 220 can also decrease.

In some embodiments, the length of the flexible display 230 is not longer than the distance between two edges of the first body 210 and the second body 220 when the angle between the first body 210 and the second body 220 is about 180°. By changing the distance between the first body 210 and the first rotation shaft 111 of the shaft assembly coupled to the first body 210 and/or the distance between the second body 220 and the first rotation shaft 111 of the shaft assembly coupled to the second body 220, the problem of the first body 210 and/or the second body 220 protruding beyond edge(s) of the flexible display 230 when the shaft structure 100 rotate can be avoided.

In some embodiments, when the angle between the first body 210 and the second body 220 increases, the distance between the first body 210 and the first rotation shaft 111 of the shaft structure 100 coupled to the first body 210 and/or the distance between the second body 220 and the first rotation shaft 111 of the shaft structure 100 coupled to the second body 220 can increase. Correspondingly, when the angle between the first body 210 and the second body 220 decreases, the distance between the first body 210 and the first rotation shaft 111 of the shaft structure 100 coupled to the first body 210 and/or the distance between the second body 220 and the first rotation shaft 111 of the shaft structure 100 coupled to the second body 220 can decrease. Thus, if the length of the flexible display 230 is not longer than the distance between two edges of the first body 210 and the second body 220 when the angle between the first body 210 and the second body 220 is about 180°, the flexible display 230 does not protrude beyond the edges of the first body 210 and the second body 220 even when the shaft structure 100 rotate.

Thus, in an electronic apparatus consistent with the embodiments, because the shaft structure 100 is provided, the angle between the first body 210 and the second body 220 can change, and the distance between the first body 210 and the first rotation shaft 111 of the shaft assembly coupled to the first body 210 and/or the distance between the second body 220 and the first rotation shaft 111 of the shaft assembly coupled to the second body 220 can also change. Thus, the problem of the flexible display 230 wrinkling or being excessively stretched can be avoided.

Figure 5:
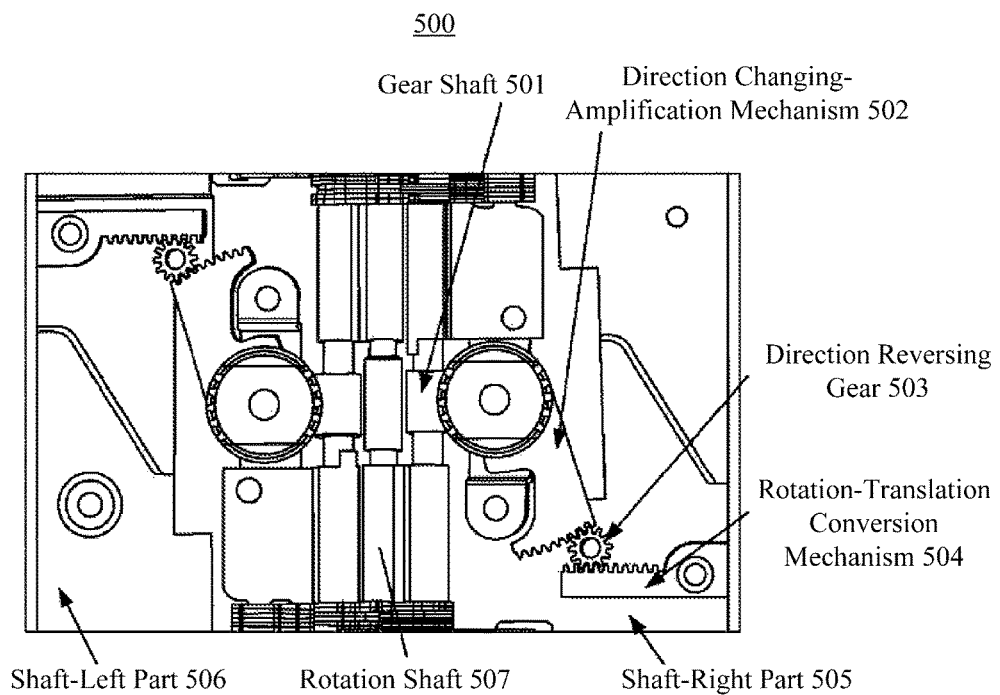
FIG. 5 shows another example of electronic apparatus consistent with some embodiments.

FIG. 5 shows another example of electronic apparatus 500 consistent with some embodiments. As shown in FIG. 5, the electronic apparatus 500 includes gear shafts 501 (each corresponding to the combination of the first rotation shaft 111 and the first transmission member 112 in the embodiments above), direction changing-amplification mechanisms 502 (each corresponding to the transmission structure 120 in the embodiments above), direction reversing gears 503 (each corresponding to the fourth transmission member 140 in the embodiments above), rotation-translation conversion mechanisms 504 (each corresponding to the moving structure 130), a shaft-right part 505 (corresponding to the first part/first body 210 in the embodiments above), a shaft-left part 506 (corresponding to the second part/second body 220 in the embodiments above), and a rotation shaft 507 (corresponding to the second rotation shaft 113 in the embodiments above).

In the example shown in FIG. 5, the rotation shaft 507, together with the gear shafts 501, the direction changing-amplification mechanisms 502, the direction reversing gears 503, and the rotation-translation conversion mechanisms 504 on both sides of the rotation shaft 507, form a shaft structure. More specifically, the gear shaft 501, the direction changing-amplification mechanism 502, the direction reversing gear 503, and the rotation-translation conversion mechanism 504 on one side, e.g., the left, of the rotation shaft 507 constitute one shaft assembly of the shaft structure that is coupled to the shaft-right part 505, and the corresponding components on the other side, e.g., the right, of the rotation shaft 507 constitute another shaft assembly of the shaft structure that is coupled to the shaft-left part 506. Such a shaft structure shown in FIG. 5 can correspond to the shaft structure (including the first and second shaft assemblies) shown in FIGS. 2 and 4.

As shown in FIG. 5, the gear shafts 501 are arranged on two sides of the rotation shaft 507, respectively. When the rotation shaft 507 rotates, the gear shafts 501 can rotate simultaneously, driving the corresponding direction changing-amplification mechanisms 502 to move. Each of the direction changing-amplification mechanisms 502 can then drive the corresponding rotation-translation conversion mechanism 504 through the corresponding direction reversing gear 503. In some embodiments, each of the rotation-translation conversion mechanisms 504 is fixed on one of the shaft-right part 505 or the shaft-left part 506. Therefore, when a rotation-translation conversion mechanism 504 moves, the corresponding shaft-right part 505 or shaft-left part 506 also moves.

In some embodiments, more than one rotation shaft 507 can be provided and the rotation shafts 507 can be engaged with each other through gears so they can rotate simultaneously.

The shaft-right part 505 and the shaft-left part 506 can be opened or closed through the rotation of the gear shafts 501. Since the coupling between each of the rotation-translation conversion mechanisms 504 and the corresponding one of the shaft-right part 505 or the shaft-left part 506 is a rigid coupling, pressing two sides of the shaft structure does not cause the middle part to bump up.

In the example shown in FIG. 5, the shaft structure includes two shaft assemblies. In some other embodiments, the shaft structure can include one or more than two shaft assemblies. In some embodiments, the shaft assemblies can be arranged to on both sides, i.e., be coupled to both of the shaft-right part 505 and the shaft-left part 506, such that both of the shaft-right part 505 and the shaft-left part 506 can move with respect to a center position of the shaft structure. In some other embodiments, the shaft assembly/assemblies can be arranged on one side, i.e., be coupled to the shaft-right part 505 or the shaft-left part 506, such that the shaft-right part 505 or the shaft-left part 506 can move with respect to a center position of the shaft structure.

In some embodiments, the direction reversing gears 503 can be omitted. In some embodiments, each shaft assembly can include more than one direction reversing gear 503.

Figure 6:
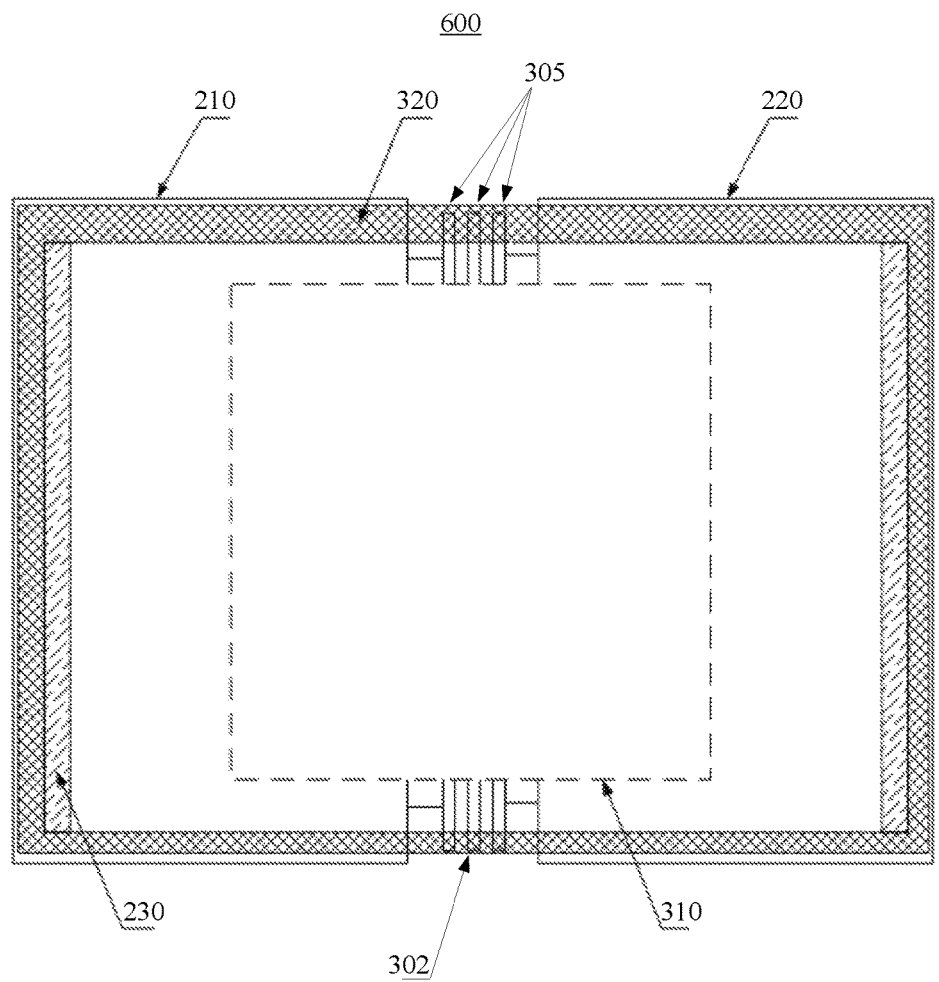
FIG. 6 shows another example of electronic apparatus consistent with some embodiments in an open state.
Figure 7:
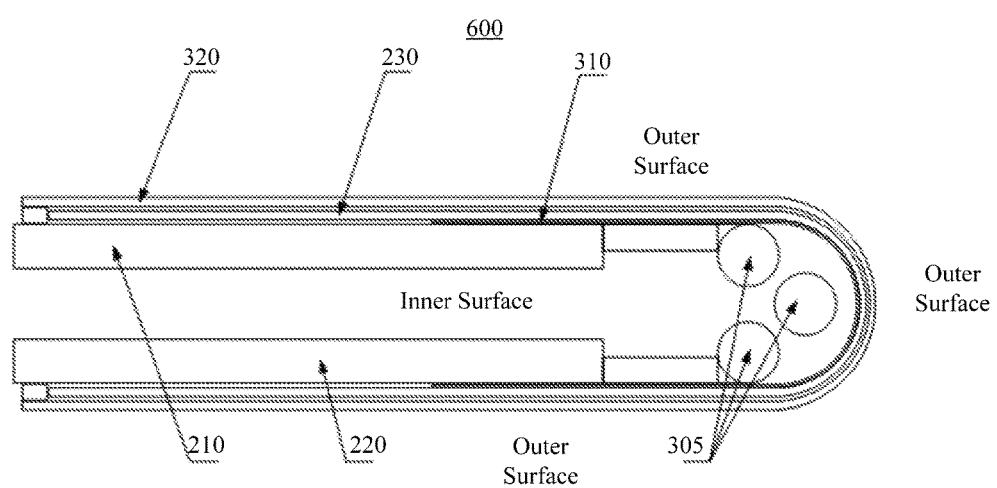
FIG. 7 shows the electronic apparatus in FIG. 6 in a closed state.

FIGS. 6 and 7 show another example of electronic apparatus 600 consistent with some embodiments. In particular, FIG. 6 shows the electronic apparatus 600 in an open state and FIG. 7 shows the electronic apparatus 600 in a closed state. As shown in FIGS. 6 and 7, the electronic apparatus 600 includes the first body 210, the second body 220, a shaft structure 302 coupling the first body 210 and the second body 220 together, and a connection mechanism coupled to the first body 210 and the second body 220. The shaft structure 302 includes a shaft set 305 including one or more rotation shafts. In some embodiments, the shaft structure 302 can include one of examples of shaft structure 100 described above. The connection mechanism includes an elastic member 310.

When the connection mechanism is used for mounting the flexible display 230 on the first body 210 and the second body 220 of the electronic apparatus 600, the elastic member 310 can be arranged on the outer surfaces, i.e., the first surfaces, of the first body 210 and the second body 220, As described above, the outer surface of the first body 210 or the second body 220 refers to the surface formed by the outer wall of the first body 210 or the second body 220 when the first body 210 and the second body 220 are in the closed or a bent state, i.e., when the angle between the first body 210 and the second body 220 is about 0°, as shown in FIG. 7. The outer surface of the electronic apparatus 600 includes the outer surfaces of the first body 210 and the second body 220. In some embodiments, the elastic member 310 is arranged on the outer surfaces of both of the first body 210 and the second body 220.

In some embodiments, the elastic member 310 can exert a pulling force on the first body 210 and the second body 220, i.e., the elastic body 310 can be attached to the first body 210 and the second body 220 in a tensile state. The flexible display 230 can be arranged on the first body 210 and the second body 220, and can bend when the first body 210 and the second body 220 rotate relative to each other.

When an external force causes the electronic apparatus 600 to change from the open state shown in FIG. 6, in which the angle between the first body 210 and the second body 220 is about 180°, to the closed state shown in FIG. 7, in which the angle between the first body 210 and the second body 220 is about 0°, i.e., when the first body 210 and the second body 220 rotate towards each other, the elastic member 310 arranged on the outer surfaces of the first body 210 and the second body 220 may be further stretched as a result of the rotation of one or both of the first body 210 and the second body 220. Meanwhile, the flexible display 230 may also bend accordingly. Because the elastic member 310 is stretched more than the flexible display 230 does, the elastic member 310 may bear a larger part of the force applied on the elastic member 310 and the flexible display 230 when the first body 210 and the second body 220 rotate relative to each other. Consequently, the flexible display 230 may bear a less part of the force or even may bear no force. As such, the elastic member 310 can protect the flexible display 230 from damages caused by excessive stretching.

On the other hand, when the first body 210 and the second body 220 change from the 0°-closed state shown in FIG. 7 to the 180°-open state shown in FIG. 6, since the elastic member 310 is in a stretching state, the restoring force of the elastic member 310 can act the driving force to facilitate the relative rotation of the first body 210 and the second body 220. During this process, the first body 210, the second body 220, and the elastic member 310 may apply no force on the flexible display 230. Therefore, the flexible display 230 will not be damaged by stretching or compressing. That is, during both the opening and the closing processes of the electronic apparatus 600, the flexible display 230 may not be damaged by a force.

In some embodiments, during the process of changing from the open state to the closed state, i.e., during the process of the first body 210 and the second body 220 rotating toward each other, the first body 210 and/or the second body 220 may also move away from the shaft set 305. This translational movement can also cause the first body 210 and/or the second body 220 to stretch the elastic member 310 and the flexible display 230. That is, a force may be applied to the elastic member 310 and the flexible display 230. However, since the elastic member 310 is coupled to both the first body 210 and the second body 220, both the force resulting from the rotation and the force resulting from the translational movement of the first body 210 and/or the second body 220 can be applied on the elastic member 310. Therefore, the elastic member 310 bear the combined force caused by the rotation and the translational movement of the first body 210 and/or the second body 220.

The connection mechanism consistent with the embodiments includes the elastic member 310 that can share at least a portion of the force applied on the flexible display 230 during the opening and closing of the first body 210 and the second body 220, such that the flexible display 230 does not bear and force or only bears a small portion of the force. As such, the possibility of the flexible display 230 being damaged can be reduced and the operation performance and product quality of the electronic apparatus can be improved.

In some embodiments, the elastic member 310 can be arranged to cover one side of the shaft structure 302, such as the shaft structure 100 described above in connection with FIGS. 1-5, and is stuck to the outer surfaces of the first body 210 and the second body 220. The first body 210 and the second body 220 can move relative to the shaft set 305, such as the shaft set 110 described above in connection with FIGS. 1-5, when being pulled by the elastic member 310. In some embodiments, the elastic member 310 can be laid on and stuck to the first body 210 and the second body 220, and stride over the shaft structure 302. The elastic member 310 can cover one side of the shaft structure 302, i.e., the outer side of the shaft structure 302, which is also the outer side of the first body 210 and the second body 220, as shown in FIG. 7. In some embodiments, the elastic member 310 always touch the shaft structure 302 but is not coupled to the shaft structure 302. This can improve the protection of the flexible display 230 by the elastic member 310. When the first body 210 and the second body 220 change from the closed state shown in FIG. 7 to the open state shown in FIG. 6, the spatial relationship between the elastic member 310 and the shaft structure 302 described above can allow the elastic member 310 to provide a driving force for the first body 210 and the second body 220 to rotate or move translationally with respect to each other.

Figure 8:
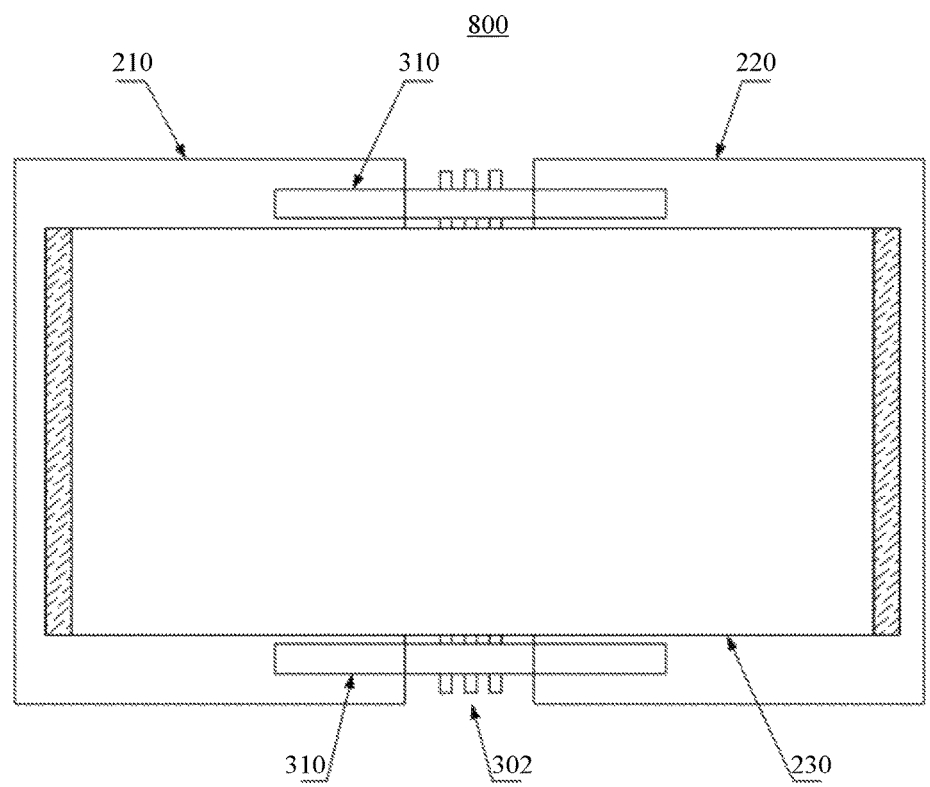
FIG. 8 shows another example of electronic apparatus consistent with some embodiments.

The elastic member 310 can have another shape and/or structure. For example, FIG. 8 shows another example of electronic apparatus 800 consistent with some embodiments. The electronic apparatus 800 is similar to the electronic apparatus 600, except that in the electronic apparatus 800, the elastic member 310 includes two strip-shaped elastic films arranged on two sides of the flexible display 230, respectively.

In some embodiments, the elastic member 310 can include, for example, a thermoplastic polyurethane (TPU) film, a silica gel film, or a rubber film.

In some embodiments, the flexible display 230 can be stuck to the first body 210 and the second body 220 using an elastic sticky material. When the first body 210 and/or the second body 220 rotates around the shaft set 305 such that the angle between the first body 210 and the second body 220 changes, e.g., from 180° to 0°, the first body 210 and/or the second body 220 may also moves translationally with respect to the shaft set 305. If the translational movement is excessive, the flexible display 230 may be stretched and damaged. Thus, in some embodiments, the elastic sticky material can be used to stick the flexible display 230 to the first body 210 and the second body 220. The elastic sticky material can deform to compensate for the excessive translational movement, thus protecting the flexible display 230 from being stretched and damaged. This can further improve the reliability of the flexible display 230. In some embodiments, the elastic sticky material can include, for example, a double-side tape or a glue.

In some embodiments, two opposite edges of the flexible display 230 on two sides of the shaft structure 302 are stuck to the first body 210 and the second body 220, respectively, as shown in, e.g., FIGS. 6 and 8, in which the linear hatching areas represent the edge portions of the flexible display 230 that are stuck to the first body 210 and the second body 220. By sticking the two edge portions, also referred to as "sticking edge portions," of the flexible display 230 to the first body 210 and the second body 220, respectively, the bending flexibility of the flexible display 230 can be ensured, and the force applied by the first body 210 and the second body 220 to the flexible display 230 during rotation can be reduced at least to a certain extent. In some embodiments, the width of each of the sticking edge portions can be chosen to ensure a coupling strength that is large enough flexible display 230 does not fall off. In some embodiments, the entire portions of the flexible display 230 that touch the first body 210 and the second body 220 can be stuck to the first body 210 and the second body 220.

In some embodiments, as shown in FIGS. 6 and 7, the connection mechanism further includes a protection member 320. Although not explicitly shown in FIG. 8, the connection mechanism in the electronic apparatus 800 can also include the protection member 320. The protection member 320 covers the flexible display 230 and is coupled to both the first body 210 and the second body 220. Because the flexible display 230 may have a low strength, it may easily be damaged if clashed or scratched. Therefore, to improve the operational safety of the flexible display 230, the protection member 320 can be applied to cover the flexible display 230, shielding the flexible display 230 from the external environment, so as to ensure the working lifetime of the flexible display 230.

In some embodiments, the protection member 320 can include a transparent film and the four edge portions of the protection member 320 can be stuck to the first body 210 and the second body 220, as shown in FIG. 6. In FIG. 6, the crosshatching areas represent the portions of the protection member 320 that are stuck to the first body 210 and the second body 220. In some embodiments, since the connection mechanism is used on the rigid parts of the electronic apparatus to connect the flexible display 230, the protection member 320 can include the transparent film to avoid any adverse effect on the display of the flexible display 230 while at the same time protect the flexible display 230. Sticking the four edges of the protection member 320 to the first body 210 and the second body 220 can improve the firmness of the coupling of the protection member 320 to the first body 210 and the second body 220 and can improve the protection effect. In some embodiments, instead of all of the four edges, two opposite edges of the protection member 320 are stuck to the first body 210 and the second body 220, respectively, as long as such an arrangement does not affect the protection effect.

In some embodiments, the protection member 320 can include, for example, a polyethylene terephthalate (PET) film, a polyvinyl chloride (PVC) film, a TPU film, or a film made of another suitable material.

In some embodiments, as shown in FIGS. 6 and 7, the elastic member 310 includes a sheet-like elastic film arranged between the flexible display 230 and the first body 210 and between the flexible display 230 and the second body 220. That is, in a laminated structure formed by the first body 210, the second body 220, the elastic member 310, and the flexible display 230, the first body 210 and the second body 220 constitute the first layer, the elastic member 310 constitutes the second layer, and the flexible display 230 constitutes the third layer. With this arrangement, the elastic member 310 can have an area as large as possible, such that the elastic member 310 can be stretched to a larger extent and can bear more pulling force. Further, the laminated structure formed by the first body 210, the second body 220, the elastic member 310, and the flexible display 230 can provide a better protection to the flexible display 230.

Figure 9:
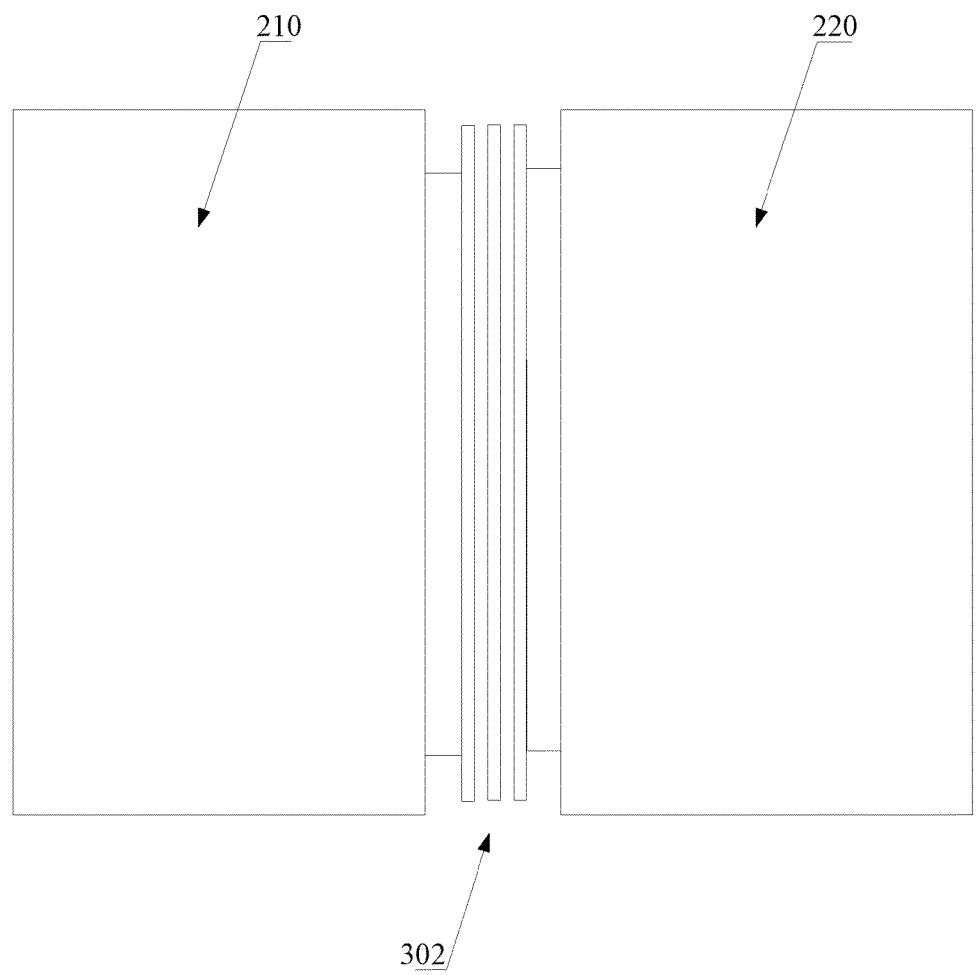
FIGS. 9-11 show different stages during a process of mounting a flexible display on the electronic apparatus shown in FIGS. 6 and 7.

FIGS. 6, 7, and 9-11 show different stages in an example of method for mounting the flexible display 230 to an electronic apparatus consistent with the embodiments, such as the electronic apparatus 600 or the electronic apparatus 800. As shown in FIG. 9, a first layer including the first body 210, the second body 220, and the shaft structure 302 is provided.

Figure 10:
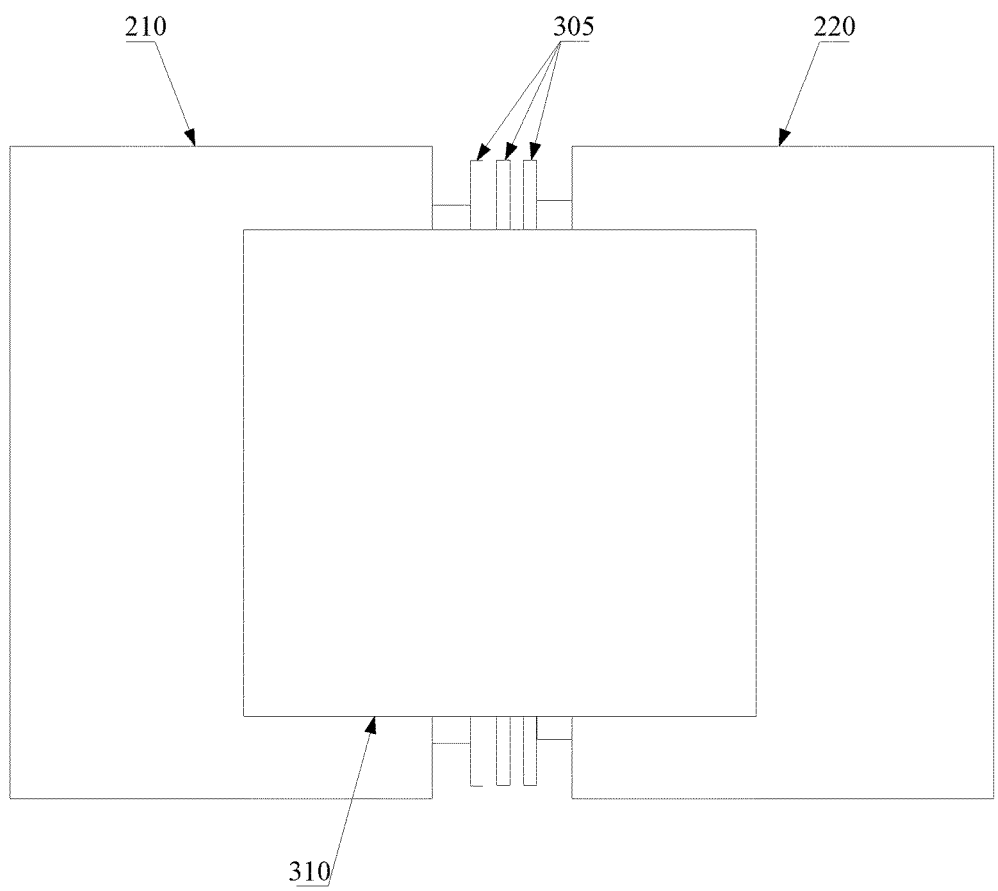

As shown in FIG. 10, a second layer including the elastic member 310 is laid on the first layer including the first body 210, the second body 220, and the shaft structure 302. the elastic member 310 can be fixedly coupled to the first body 210 and the second body 220 in a stretching state. The elastic member 310 covers and strides over the shaft structure 302 that couples the first body 210 and the second body 220 together. The elastic member 310 can touch but is not fixedly coupled to the shaft structure 302.

Figure 11:
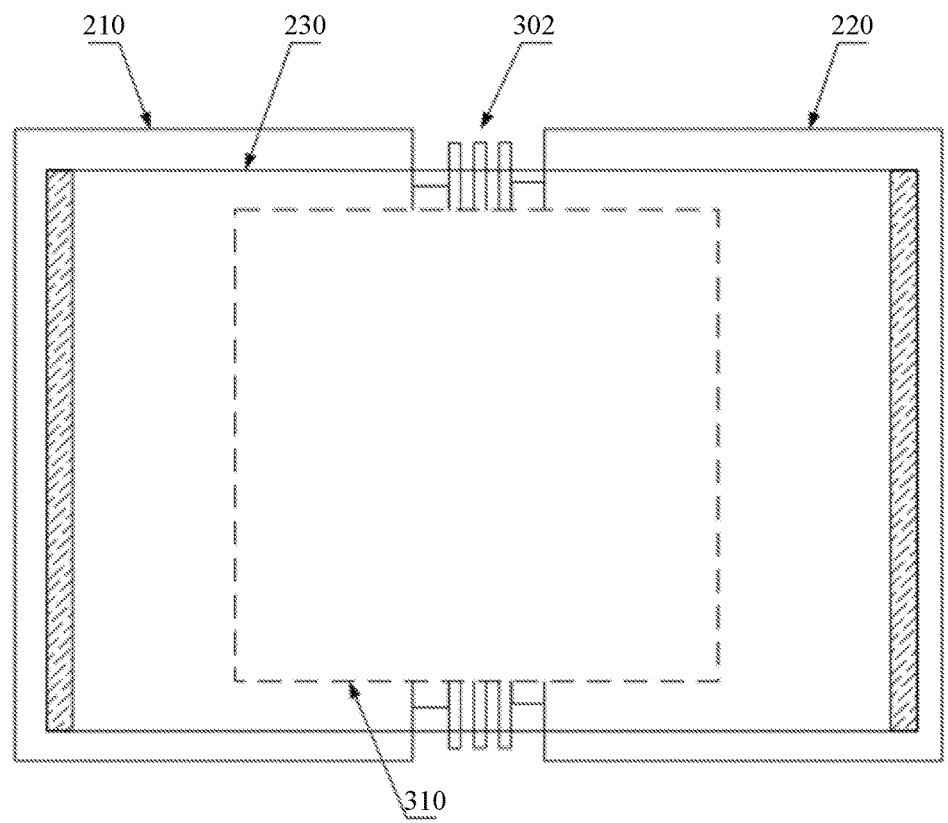

As shown in FIG. 11, a third layer including the flexible display 230 is laid on the elastic member 310. Two opposite edge portions of the flexible display 230 are coupled to the first body 210 and the second body 220, respectively. The flexible display 230 completely covers the elastic member 310. As a result, the first body 210, the second body 220, the elastic member 310, and the flexible display 230 form a multi-layer stacked structure, as shown in FIG. 11.

In some embodiments, the method further includes forming the protection member 320 to cover the flexible display 230, as shown in FIGS. 6 and 7. The protection member 320 can protect the flexible display 230 from being cut or scratched. To protect the flexible display 230 from all sides, the four edges of the protection member 320 can be coupled to the first body 210 and the second body 220. The protection member 320 can constitute a fourth layer of the above-described stacked structure, as shown in FIGS. 6 and 7.

The structures of different portions of the electronic apparatus, the shaft structure, and the connection mechanism have been described in a progressive manner. An electronic apparatus, a shaft structure, or a connection mechanism consistent with the embodiments can be obtained by combining the structures of two or more of the portions.

Other embodiments of the disclosure will be apparent to those skilled in the art from consideration of the specification and practice of the embodiments disclosed herein. It is intended that the specification and embodiments be considered as examples only and not to limit the scope of the disclosure, with a true scope and spirit of the invention being indicated by the following claims.

What is claimed is:

1. A shaft structure comprising:
   a first rotation shaft including a first transmission member fixedly arranged on the rotation shaft;
   a transmission structure coupled to and rotating along with the first rotation shaft, the transmission structure including a second transmission member engaged with the first transmission member;
   a moving structure coupled to the transmission structure and moving translationally with respect to the first rotation shaft in response to a rotation of the transmission structure; and
   a second rotation shaft including a third transmission member fixedly arranged on the second rotation shaft, the third transmission member being engaged with the first transmission member, and the first transmission member and the third transmission member rotating in opposite directions.

2. The shaft structure of claim 1, wherein the transmission structure further includes a fourth transmission member, a first end of the fourth transmission member being fixedly coupled to the second transmission member, and a second end of the fourth transmission member being linked with the moving structure and driving the moving structure to move along a line connecting the moving structure and the first rotation shaft.

3. The shaft structure of claim 2, further comprising:
   a fifth transmission member,
   wherein:
      the moving structure includes a transmission bar fixedly arranged on the moving structure,
      a first side of the fifth transmission member is engaged with the second end of the fourth transmission member, and
      a second side of the fifth transmission member is engaged with the transmission bar.

4. The shaft structure of claim 3, wherein:
   the first transmission member includes a first gear,
   the second transmission member includes a second gear, and
   the fifth transmission member includes a third gear.

5. An electronic apparatus comprising:
   a first body;
   a second body; and
   a shaft structure coupling the first body to the second body, the shaft structure including:
      a rotation shaft including a first transmission member fixedly arranged on the rotation shaft;
      a transmission structure coupled to and rotating along with the rotation shaft, the transmission structure including a second transmission member engaged with the first transmission member; and
      a moving structure coupled to the transmission structure and moving translationally with respect to the rotation shaft in response to a rotation of the transmission structures
      wherein the transmission structure further includes a third transmission member, a first end of the third transmission member being fixedly coupled to the second transmission member, and a second end of the third transmission member being linked with the moving structure and driving the moving structure to move along a line connecting the moving structure and the rotation shaft.

6. The electronic apparatus of claim 5, wherein:
   the shaft structure further includes a fourth transmission member,
   the moving structure includes a transmission bar fixedly arranged on the moving structure,
   a first side of the fourth transmission member is engaged with the second end of the third transmission member, and
   a second side of the fourth transmission member is engaged with the transmission bar.

7. The electronic apparatus of claim 6, wherein:
   the first transmission member includes a first gear,
   the second transmission member includes a second gear, and
   the fourth transmission member includes a third gear.

8. The electronic apparatus of claim 5, wherein:
   the rotation shaft is a first rotation shaft, and
   the shaft structure further includes a second rotation shaft including a fourth transmission member fixedly arranged on the second rotation shaft, the fourth transmission member being engaged with the first transmission member, and the first transmission member and the fourth transmission member rotating in opposite directions.

9. The electronic apparatus of claim 5, wherein:
   the first body is coupled to the moving structure, and
   the second body is coupled to two sides of the rotation shaft.

10. The electronic apparatus of claim 5, wherein:
    the rotation shaft is a first rotation shaft, the transmission structure is a first transmission structure, and the moving structure is a first moving structure,
    the shaft structure further includes:
       a second rotation shaft coupled to the first rotation shaft;
       a third rotation shaft coupled to the second rotation shaft;
       a second transmission structure coupled to the third rotation shaft; and
       a second moving structure coupled to the second transmission structure,
    the first body is coupled to the first moving structure, and
    the second body is coupled to the second moving structure.

11. The electronic apparatus of claim 5, further comprising:
    a flexible display covering the first body and the shaft structure, one end of the flexible display being fixedly attached to the first body.

12. The electronic apparatus of claim 11, wherein:
    the flexible display is arranged on the first body, the shaft structure, and a first surface of the second body, and
    a second surface of the second body that is opposite to the first surface faces the first body in a closed state of the electronic apparatus.

13. The electronic apparatus of claim 5, further comprising:
    an elastic member attached to the first body and the second body, the elastic member being arranged over an outer surface of the first body and an outer surface of the second body in a closed state of the electronic apparatus.

14. The electronic apparatus of claim 13, further comprising:
    a flexible display covering the first body, the second body, the shaft structure, and the elastic member, the flexible display being fixedly attached to the first body and the second body.

15. The electronic apparatus of claim 14, wherein two edge portions of the flexible display opposite to each other are stuck to the first body and the second body, respectively.

16. The electronic apparatus of claim 15, wherein the two edge portions of the flexible display are stuck to the first body and the second body, respectively, through an elastic sticky material.

17. The electronic apparatus of claim 14, further comprising:
   a protection member covering the flexible display and attached to the first body and the second body.

18. The electronic apparatus of claim 17, wherein four edges of the protection member are attached to the first body and the second body.

* * * * *